(12) United States Patent
Chintalapati et al.

(10) Patent No.: US 10,094,499 B2
(45) Date of Patent: Oct. 9, 2018

(54) QUICK-CONNECT CLIP-ON CONNECTOR

(71) Applicant: NOBEL PLASTIQUES, Poissy (FR)

(72) Inventors: Ramakrishnam Raju Chintalapati, Poissy (FR); Fabien Porignaux, Poissy (FR)

(73) Assignee: NOBEL PLASTIQUES (FR)

( * ) Notice: Subject to any disclaimer, the term of this patent is extended or adjusted under 35 U.S.C. 154(b) by 256 days.

(21) Appl. No.: 15/026,698

(22) PCT Filed: Oct. 3, 2013

(86) PCT No.: PCT/EP2013/070546
§ 371 (c)(1),
(2) Date: Apr. 1, 2016

(87) PCT Pub. No.: WO2015/049006
PCT Pub. Date: Apr. 9, 2015

(65) Prior Publication Data
US 2016/0252201 A1    Sep. 1, 2016

(51) Int. Cl.
*F16L 37/00* (2006.01)
*F16L 37/084* (2006.01)

(52) U.S. Cl.
CPC ................ *F16L 37/0841* (2013.01)

(58) Field of Classification Search
CPC .......................................... F16L 37/0841
USPC ................................. 285/305, 308
See application file for complete search history.

(56) References Cited

U.S. PATENT DOCUMENTS

| 5,090,747 A | 2/1992 | Kotake | |
|---|---|---|---|
| 5,374,088 A * | 12/1994 | Moretti | F16L 37/0841 285/305 |
| 2011/0271515 A1* | 11/2011 | Poder | F16L 21/03 29/525.01 |

(Continued)

FOREIGN PATENT DOCUMENTS

| DE | 40 35 581 A1 | 5/1991 |
|---|---|---|
| EP | 0 605 801 A1 | 7/1994 |
| EP | 0 905 430 A2 | 3/1999 |

(Continued)

OTHER PUBLICATIONS

International Search Report dated Jun. 6, 2014 issued in corresponding International Patent Application No. PCT/EP2013/070646.

(Continued)

*Primary Examiner* — David Bochna
*Assistant Examiner* — James A Linford
(74) *Attorney, Agent, or Firm* — Ostrolenk Faber LLP

(57) ABSTRACT

This female clip-onconnector (1), which is adapted to cooperate with a male attachment end fitting (20) of the type with a central bush (26) and a flange (25), includes a body (2) forming a cylindrical cavity and a transverse latch housing in front of the opening of the cylindrical cavity forming a housing for a single latch part (50) including two actuating parts (51) connected respectively to two jaws (52), said actuating parts and said jaws acting in a same direction transverse to the axis of the body, and spring means (54) for spring-loading each jaw (52) at all times towards its rest position in which the jaw (52) is close to the axis and in which the actuating part (51) is in its radially outermost position.

8 Claims, 2 Drawing Sheets

(56) References Cited

U.S. PATENT DOCUMENTS

2014/0197629 A1* 7/2014 Barthel ............... F16L 37/0985
                                                                   285/93
2014/0353961 A1* 12/2014 Milhas ................ F16L 37/0841
                                                                   285/82

FOREIGN PATENT DOCUMENTS

| EP | 1 832 220 A2 | 9/2007 |
| FR | 2 358 611 A1 | 2/1978 |
| FR | 2 919 373 A1 | 1/2009 |
| WO | WO 98/40643 A1 | 9/1998 |

OTHER PUBLICATIONS

Written Opinion dated Jun. 6, 2014 issued in corresponding International Patent Application No. PCT/EP2013/070646.

* cited by examiner

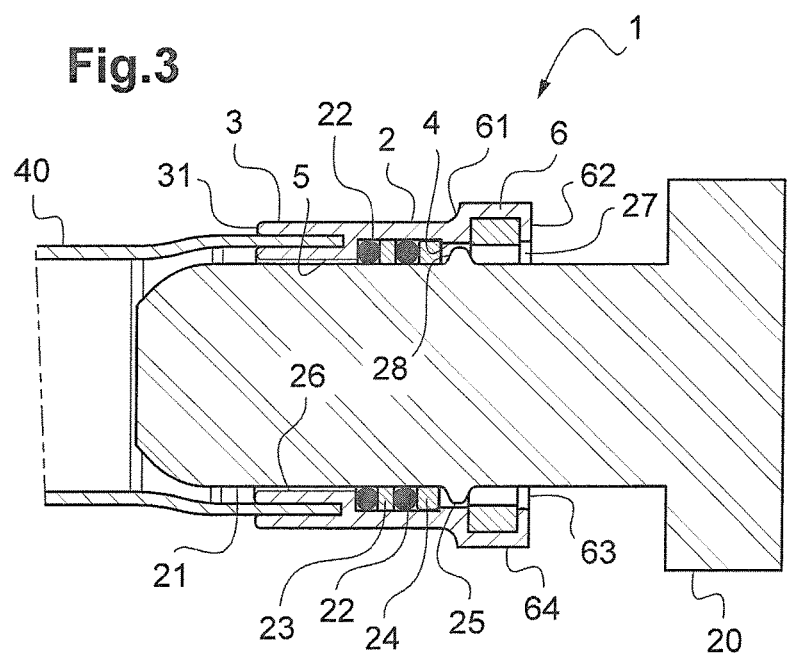
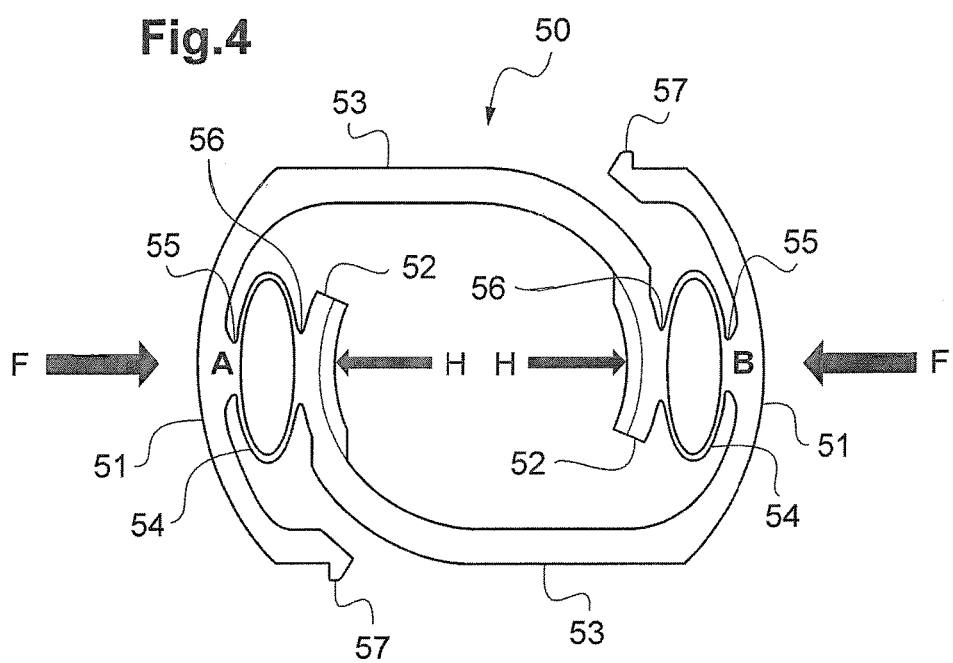

QUICK-CONNECT CLIP-ON CONNECTOR

CROSS REFERENCE TO RELATED APPLICATIONS

The present application is a 35 U.S.C. § 371 National Phase conversion of PCT/EP2013/070646, filed Oct. 3, 2013, the disclosure of which is incorporated herein by reference.

TECHNICAL FIELD OF THE INVENTION

The present invention concerns a female clip-on connector adapted to cooperate with a flanged male attachment end fitting.

BACKGROUND OF THE INVENTION

In the present document, this assembly of two male-female elements is called a "connector". It is normal, notably in the automotive industry, to use such clip-on connectors to produce the quick and demountable connection of an element of a fluid (for example fuel, oil or water) circuit to another circuit element. Virtually standardized in the industry is the use of male end fittings including a cylindrical bush surrounded by a flange and the female connectors include a cylindrical cavity adapted to receive at least the end of the bush and an elastic latch adapted to lock onto the back of the flange once the latter is in place. O-rings provide the seal around the male end fitting.

The document EP 0 605 801 discloses a connector in which the latch is symmetrical and disposed transversely in a latch housing formed between the opening of the cylindrical cavity of the body and a rigid entry ring of the body placed at a distance in front of the opening of the cylindrical cavity of the body and fastened to the body. The oval or lozenge-shaped latch part is elastically deformable and includes two actuating members at two opposite apex and two jaws at two other apex. In the rest position, the actuating members are flush with the external envelope of the body and accessible to two opposed fingers of a user. When the user presses these parts radially inwards, the latch part is deformed and moves the two jaws laterally away from each other and away from the axis of the body so that the jaws are retracted and release the adjacent central region of the periphery of the male end fitting and allow disengagement of the flange and therefore of the male end fitting.

The single lozenge-shaped latch part proves relatively fragile in use. To enable its elastic operation, it is necessary to provide connecting parts that are not too thick or too rigid and because of this the jaws may be retained insufficiently and not exert sufficient force on the flange of an end fitting to prevent pulling out of the end fitting.

SUMMARY OF THE INVENTION

The object of the invention is to improve a connector of this type by virtue of a construction enabling greater robustness and increased resistance of the jaws to pulling out.

The invention achieves its object thanks to a female clip-on connector adapted to cooperate with a male attachment end fitting of the type with a central bush and a flange, the connector including on the one hand a rigid plastic material body comprising on one side a tubular part for connection to a pipe and on the other side a part forming an open cylindrical cavity adapted to receive at least the end of the bush and on the other hand an elastic latch constituted by a single latch part independent of the body, disposed transversely in a latch housing fixed relative to the body and placed in front of the opening of the cylindrical cavity of the body so as to lock onto the back of the flange of the end fitting once the latter is in place in the cylindrical cavity (at the rear relative to the direction of insertion of the end fitting, but at the front relative to the overall orientation of the connector), said single latch part being symmetrical and comprising two radially opposite curved jaws adapted to be moved towards each other or away from each other and away from the axis of the body when acted on by two radially opposite actuating parts flush in a rest position with the external envelope of the body and accessible to two opposite fingers of a user for actuating the jaws, the jaws being spring-loaded into a close-together rest position in which they form a transverse abutment at the rear of the flange of the end fitting when the latter is in place, the jaws enabling radially outward retraction of this transverse abutment when they are pushed into a spread apart position by the actuating parts when they are pressed in by the user, characterized in that the two jaws and the two actuating parts act in a same direction transverse to the axis of the body, each actuating part, orthogonal to said transverse direction, being disposed facing a respective jaw, also orthogonal to said transverse direction, and being rigidly connected by a rigid connecting bar oriented in said transverse direction to the other jaw, respective spring means being disposed between the external and internal surface parts respectively of each jaw and the facing actuating part to continuously spring-load each jaw towards its rest position in which the jaw is close to the axis and in which the actuating part is in its radially outermost position.

Thanks to this arrangement, the strength of the single latch part is increased, enabling the jaws to exert a higher force able to prevent pulling out of the end fitting. Moreover, the single latch part is of very simple construction and easy to assemble to the connector.

More particularly, in accordance with one advantageous feature of the invention, the spring means that spring-load each jaw consist of an elastically deformable leaf spring the contour of which is oval, preferably elliptical, having opposite curved surface parts adapted to bear on the external surface part of a jaw and on the internal surface part of the facing actuating part, respectively.

The whole of the latch part may advantageously be moulded so that the jaws, the actuating parts, the connecting bars and the leaf springs form a plastic assembly moulded in one piece. In this case, it is advantageous to use a moulding technique employing two materials (for example over-moulding of two materials or injection moulding of two materials) to produce the leaf spring part in a suitable material, having a lower modulus of elasticity, i.e. being more elastic, than the material used to mould the rest of said assembly.

The body and the latch housing advantageously form a single moulded plastic material part.

The cylindrical cavity of the body advantageously includes a cylindrical first section extending from the opening of the cylindrical cavity to an internal cylindrical housing adapted to receive the end of the male end fitting, the cylindrical first section having a diameter greater than that of the male end fitting and accommodating at least an O-ring, a spacer ring and a closure ring.

Two O-rings are preferably provided separated by the spacer ring that is mounted in the cylindrical first section. The closure ring for its part is preferably force-fitted in the cylindrical first section to immobilize the O-rings and the spacer ring. Its periphery may comprise raised patterns, for example splines, facilitating this force-fitting.

The transverse latch housing advantageously comprises abutment means adapted to cooperate with respective distal ends of the actuating parts to define the rest position and the spread apart position of the jaws.

The present invention further concerns a pipe intended for transporting fluid, notably fuel, oil or water, characterized in that said pipe comprises at least one end provided with a connector in accordance with the invention.

BRIEF DESCRIPTION OF THE DRAWINGS

Other features and advantages of the invention will emerge from the following description of one embodiment. The appended drawings are referred to, in which:

FIG. 3 is a view in longitudinal section of the connector from FIG. 1 in the assembled state with the male end fitting mounted in the connector.

FIG. 4 represents a cross section of the elastic latch of the connector of the invention shown on its own.

DESCRIPTION OF EMBODIMENTS

Figure 1:
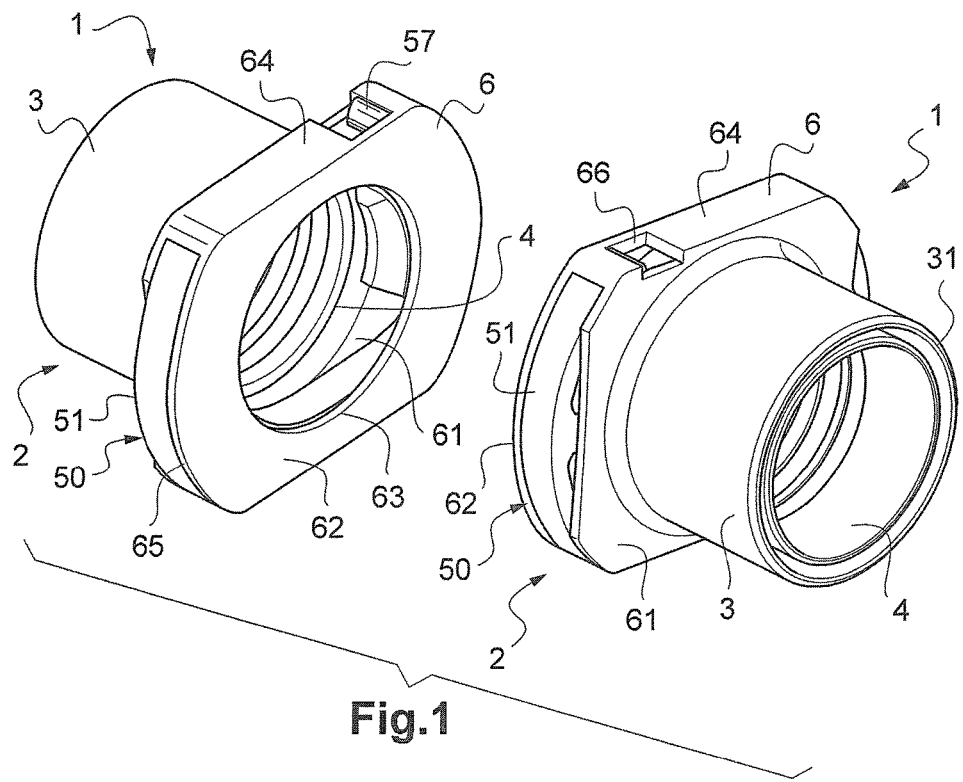
FIG. 1 is a perspective view of the connector in accordance with the invention in the assembled state, in front view and in back view.

The quick-connect connector 1 essentially comprises a body 2 that includes at the rear a tubular part in the form of a hollow spigot 3 and at the front a cylindrical cavity or chamber 4 in which is engaged a male end fitting 20 formed of a bush 26 provided with a clip-on flange 25. The spigot 3 includes an axial circular groove 31 for the axial insertion of a pipe 40. Alternatively, the spigot 3 may include on its exterior surface connecting profiles that are not represented, for example barbs or single or double beads, for force-fitting into a pipe, or may be fastened to a tube or some other member by welding (rotation, ultrasound, induction or laser welding).

As FIG. 3 shows, the cylindrical cavity 4 defines an interior cylindrical space having a cylindrical first section starting from the opening of the cylindrical cavity 4 at the front of the body 2 and extending as far as an internal cylindrical housing 5, defining a cylindrical passage having an inside diameter suitable to have the distal end 21 of the male end fitting 20 passed through it. The cylindrical cavity 4 may receive two O-rings 22 separated by a seal spacer 23 together with a closure ring 24 notched axially at its periphery so as to be force-fitted into the cavity 4 and fixed therein substantially in the vicinity of the opening of the cavity 4. Accordingly, once assembled, the members 22-23-22-24 bear against one another. The O-ring ring members 22-24 have the male end fitting 20 pass through them, its flange 25 bearing in the vicinity of or even on the closure ring 24. A shoulder that is not represented may be formed in the cylindrical cavity for fixing an abutment for positioning the closure ring 24.

A transverse latch housing 6 fixed relative to the body 2 is placed in the front part of the body 2 in front of the opening of the cylindrical cavity 4 of the body 2 and is adapted to receive an elastic latch 50 constituted of a single latch part described in more detail hereinafter.

Figure 2:
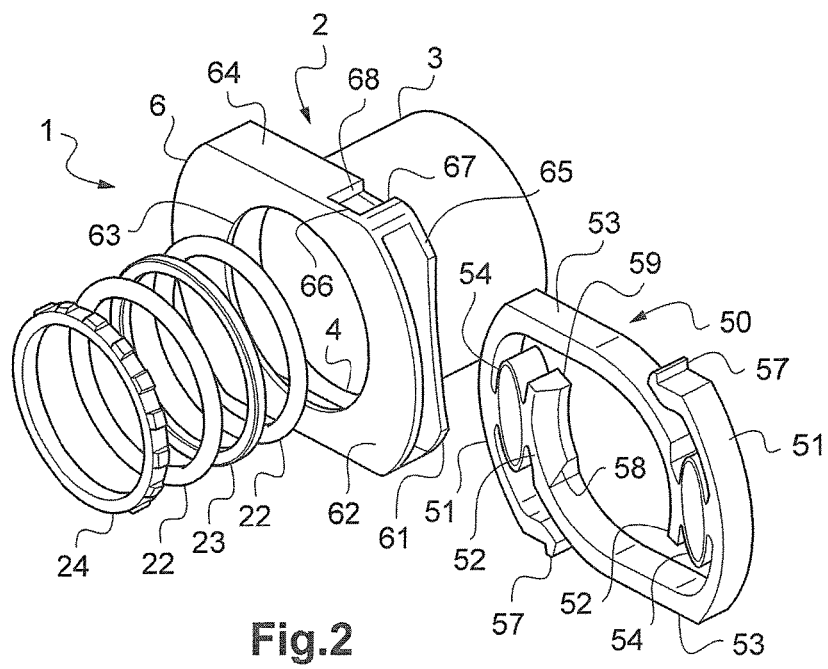
FIG. 2 is an exploded perspective view of the connector from FIG. 1 in the non-assembled state.

The transverse latch housing 6 includes a transverse posterior wall 61 extending radially outwards and aligned with the front opening of the cylindrical cavity 4 and a transverse anterior wall 62 parallel to and at a distance from the transverse posterior wall 61 so as to form between these two members a space adapted to house the latch 50. The anterior and posterior transverse walls include a central passage 63 for the male end fitting 20 to pass through into the cylindrical cavity 4 without contact with them. As seen in FIGS. 1 and 2, a lateral wall 64 partially closes the lateral space between the edges of the anterior and posterior transverse walls, leaving two opposite lateral openings 65 adapted to allow actuating parts 51 of the latch 50 to be seen, which actuating parts 51 in the rest position are flush with the surface of the envelope of the connector (constituted of the body and the transverse latch housing) through said opposite lateral openings 65. The lateral wall 64 also includes two substantially radially opposite notches 66, each of these notches being adapted to cooperate with the distal end of a corresponding actuating part 51 of the latch 50 when the latter is in the latch housing 6.

When the body 2 is of moulded plastic material, the transverse latch housing is advantageously moulded in one piece with the body 2.

The latch is constituted of a single latch part 50 adapted to be mounted in the transverse latch housing 6, the part 50 being designed to be elastically deformable in a direction transverse to the axis of the body 2 which corresponds to the horizontal direction in the plane of FIG. 4 passing through the axis of the body. It includes two radially opposite curved jaws 52 and two corresponding and also radially opposite actuating parts 51 radially outside the jaws 52, the jaws 52 and the actuating parts 51 being disposed in a transverse plane of the device and generally orthogonal to the transverse direction of elastic deformation of the latch part 50. To be more precise, each jaw 52 is connected by a rigid connecting bar 53 to a corresponding actuating part 51 which overhangs at the end of the connecting bar 53 so that each actuating part 51 is face-to-face with a jaw 52 connected to the other actuating part 51. The two jaws 52 and the two actuating parts 51 are therefore adapted to act in the same direction transverse to the axis of the body, which defines the transverse direction of elastic deformation of the latch part, and are substantially aligned in this direction.

Moreover, an elastically deformable leaf spring 54 having a preferably elliptical contour is moulded in one piece with the rest of the single latch part 50 and is disposed between bearing points 55, 56 formed on the internal and external surface parts, respectively, of each actuating part 51 and each facing jaw 52. The opposite curved surface parts of each leaf spring 54 therefore bear respectively on the external surface part of one jaw 52 and on the internal surface part of the actuating part 51 of the other jaw 52, i.e. the immediately facing actuating part 51, so as to continuously spring-load each jaw 52 towards its rest position in which the jaw 52 is close to the axis of the body and the actuating part 51 is in its radially outermost position. Each actuating part 51 further includes a distal end forming a shoulder 57 adapted to be engaged in the corresponding notch 66 in the lateral wall 64 of the housing 6, the ends of the notch 66 defining two transverse abutments 67 and 68 orthogonal to the walls 61, 62, respectively an exterior abutment defining the rest position and an interior abutment defining the spread apart position of the jaws.

Thus in FIG. 4 the single latch part 50 is shown in the rest position, in which the actuating parts 51 are symmetrically at the maximum spread apart from each other position, this rest position being therefore defined by the cooperation of the shoulder 57 of the respective actuating parts 51 against the exterior transverse abutment 67 formed at the exterior end of the notch 66. In contrast, in this position, in which the external surface part of the actuating parts 51 is flush with the lateral surface of the body at the level of the opposite lateral openings 65 of the latch housing 66, the jaws 52 are concentric and in their closest together position by virtue of the bearing force exerted on them by the elastically deformable leaf spring 54. In this close together position, the curved jaws 52 define between them an inside diameter between the outside diameter of the male end fitting 20 and that of the flange 25, so that in this position the flange 25 is prevented from disengagement toward the front of the connector (toward the rear of the end fitting relative to its direction of insertion). It is therefore immobilized axially on both sides, which ensures the fixing of the end fitting 20 in the connector.

If the user presses simultaneously on the two actuating parts 51, substantially at the level of the points A and B and in the direction of the arrows F in FIG. 4, the two parts 51 move toward each other over a limited travel until at the end of this travel their distal end 57 abuts on the interior transverse abutment 68. To be more specific, when manual pressure is applied to an actuating part, the jaw associated with that actuating part, i.e. the opposite jaw connected to that actuating part by a connecting bar, as opposed to that immediately facing it connected to the other actuating part radially opposite this actuating part, is moved the same way in the same direction as this actuating part. The same applies to the other jaw by virtue of the manual pressure applied to the other actuating part radially opposite this actuating part. This being so, the two jaws 52 move away from each other, as shown by the arrows H in FIG. 4, into a position which then, thanks to this retraction, allows the flange 25 to the front of the body between the two jaws 52. During this movement, the leaf springs 54 are compressed elastically by the conjugate movement in opposite directions of the jaws and the respective facing actuating parts, between which the leaf springs 54 are disposed.

Given the elastic force of the leaf springs 54, it suffices for the user to release the manual pressure on the two actuating parts 51 for on the one hand the actuating parts to resume their spread apart overall position defined by the exterior abutment 67 and on the other hand the jaws 52 to return to their concentric and closest together position, which is the rest position immobilizing the end fitting.

As seen on the profile of the jaws 52 in FIG. 2, each curved jaw 52 comprises a leading part of small inside diameter forming a conical chamfer 58 followed by a cylindrical enlargement the face 59 of which opposite the leading chamfer 58 forms a transverse abutment shoulder for the flange 25 which also comprises toward the front of the connector a substantially transverse abutment face 27 while its rear face 28 opposite its abutment face may be slightly inclined and adapted to slide on the leading chamfer 58 of the jaws 52, which allows the jaws to open automatically upon insertion of the end fitting 20, the end fitting 20 being thereafter retained by the cooperation of the two transverse faces 59, 27 abutted against each other.

An advantageous application of the connector according to the invention relates to the connection of a pipe, such as a fuel filler pipe to a tank for containing the fuel in an automotive environment. Typically, the filler pipe is adapted to extend between a fuel filler inlet and the tank. That pipe comprises metallic parts and/or plastic parts preferably manufactured from thermo plastics and may be more or less long or short and may be of convoluted configuration depending upon the relative location of the tank and the filler inlet. The end of the pipe which is intended to be fixed to the tank is equipped with the connector of the invention enabling a quick clip-on connection with the tank.

The invention claimed is:

1. A female clip-on connector adapted to cooperate with a male attachment end fitting with a central bush and a flange, the female clip-on connector including:
   a rigid plastic material body comprising on one side a tubular part configured to connect to a pipe, and on the other side a part forming an open cylindrical cavity adapted to receive at least an end of the central bush;
   an elastic latch comprising a single latch part independent of the body, the latch part disposed in a transverse direction in a latch housing fixed relative to the body and placed in front of the opening of the cylindrical cavity of the body so as to lock onto a back of the flange of the male attachment end fitting once the male attachment end fitting is in place in the cylindrical cavity;
   said single latch part being symmetrical and comprising:
   two radially opposite curved jaws adapted to be moved towards each other or away from each other and away from the axis of the body, and
   two radially opposite actuating parts flush in a rest position with the external envelope of the body and configured to be accessible to two opposite fingers of a user for actuating the jaws,
   the jaws being spring-loaded into a rest position adjacent each other in which they form a transverse abutment at the rear of the flange of the male attachment end fitting when the male attachment end fitting is in place, the jaws enabling radially outward retraction of this transverse abutment when the jaws are pushed into a spread apart position by the actuating parts;
   wherein the jaws and the two actuating parts act in a same direction transverse to the axis of the body,
   wherein each actuating part is transverse to said transverse direction, is disposed facing a respective jaw, also is transverse to said transverse direction, and is rigidly connected by a rigid connecting bar oriented in said transverse direction to the other jaw; and
   a respective spring disposed between external and internal surface parts, respectively, of each jaw and the facing actuating part to continuously spring-load each jaw towards its rest position in which the jaw is adjacent to the axis and in which the actuating part is in its radially outermost position,
   wherein each spring comprises an elastically deformable leaf spring with an oval contour, each spring comprising opposite curved surface parts adapted to bear on the external surface part of a respective jaw and on the internal surface part of the facing actuating part,
   wherein the jaws, the actuating parts, the connecting bars and the leaf springs form a plastic assembly moulded in one piece.

2. The connector according to claim 1, wherein the leaf springs are made from a material having a modulus of elasticity lower than that of the material used to mould the rest of said assembly.

3. The connector according to claim 1, wherein the body and the transverse latch housing form a single moulded plastic material part.

4. The connector according to claim 1, wherein the cylindrical cavity of the body includes a cylindrical first section extending from the opening of the cylindrical cavity to an internal cylindrical housing adapted to receive the end of the male end fitting,
   wherein the cylindrical first section has a diameter greater than that of the male end fitting and accommodating at least an O-ring, a spacer ring and a closure ring.

5. The connector according to claim 4, wherein the closure ring is force-fitted in the cylindrical first section to immobilize the O-ring and the spacer ring.

6. Colin The connector according to claim 1, wherein the transverse latch housing comprises an abutment cooperating with respective distal ends of the actuating parts to define the rest position and the spread apart position of the jaws.

7. A pipe configured to circulate a fluid comprising fuel, oil or water, said pipe comprising at least one end provided with said connector according to claim 1.

8. The connector according to claim 1, wherein the oval contour of the leaf spring is elliptical.

\* \* \* \* \*

UNITED STATES PATENT AND TRADEMARK OFFICE
CERTIFICATE OF CORRECTION

PATENT NO.         : 10,094,499 B2
APPLICATION NO.    : 15/026698
DATED              : October 9, 2018
INVENTOR(S)        : Chintalapati et al.

Page 1 of 1

It is certified that error appears in the above-identified patent and that said Letters Patent is hereby corrected as shown below:

On the Title Page

Item (86) should read:
(86) PCT No. PCT/EP2013/070646

Signed and Sealed this
Fourth Day of December, 2018

Andrei Iancu
*Director of the United States Patent and Trademark Office*